3,062,672
ASPHALT-AGGREGATE COMPOSITIONS
Rudolf E. Kerkhoven and Folkert Dijkstra, Amsterdam, Netherlands, assignors to Shell Oil Company, a corporation of Delaware
No Drawing. Filed Sept. 21, 1959, Ser. No. 841,047
2 Claims. (Cl. 106—281)

The invention relates to a composition based on a mineral aggregate and asphaltic bitumen. More particularly, it relates to a composition which is suitable for the manufacture of molded articles, in particular hollow molded articles, such as pipes and hollow bricks, by placing the composition in a mold at elevated temperature and compacting it therein under pressure.

The principal problem occurring in the manufacture of molded articles from compositions of this kind is to obtain a sufficient non-deformability of the molded articles. By molded articles of sufficient non-deformability is meant molded articles which substantially retain their shape when subjected to mechanical loads of short or long duration, and to fluctuations of temperature. This problem is especially important for hollow molded articles, as good non-deformability can be obtained more readily with solid molded articles than with hollow ones. In fact, the manufacture of hollow molded articles of good quality has hitherto been an unsolved problem.

In the German patent specification No. 750,627 it is proposed to manufacture hollow molded articles by mixing 88 parts by weight of mineral aggregate such as stone chippings, crushed slag, quartz sand or stone powder at a temperature in the range of from 250–300° C. with 12 parts by weight of hard-blown asphaltic bitumen having a softening point (ring and ball) of 120–175° C. and to place this mixture in a mold at a temperature in the range of from 250–300° C. and to compact it therein by compression or tamping. It has not, however, been found possible to manufacture hollow molded articles of a satisfactory quality on a commercial scale by this well-known process. In some cases the manufacture of molded articles is a complete failure, in others the resultant molded articles do not retain their shape sufficiently and are porous or brittle. As regards the former property, it is stated in the German patent specification that the resultant molded articles can withstand an internal pressure of 6 atm. and a top load of 3480 kg., but such data are obtained with load tests of short duration and are inconclusive as to the effect of prolonged, but not so very high loads as occur in practice, on the shape of the molded articles, e.g. when pipes are laid in the ground or when stored in stacks, in which case increase of temperature caused by solar radiation may constitute a further factor.

The process described in the German patent specification No. 750,627 may be improved upon by using a well-graded mineral aggregate as starting material and adjusting thereto the quantity of asphaltic bitumen. By a well-graded mineral aggregate is meant one in which stone, sand and a filler are present in such ratios that the voids in the mineral aggregate are of minimum size or substantially so. By stone is meant a mineral aggregate which is retained on a sieve having round-hole diameters of 2.4 mm.; by sand a mineral aggregate passing the same sieve, but retained on a sieve having square mesh openings 0.075 mm. wide; and by a filler a mineral aggregate passing the latter sieve. The minimum voids obtainable depend among other things on the maximum dimensions of the stone incorporated in the mineral aggregate, these often being no more than about ⅓ of the minimum dimension of the molded article to be manufactured. In a well-graded mineral aggregate the voids are approximately 15–25% by volume and in such an aggregate the quantities of stone, sand and filler generally vary within the following limits: 30–60% by weight of stone, 25–50% by weight of sand, 5–25% by weight of inorganic filler. Suitable fillers include silica, magnesia, burnt lime, powdered quartz, powdered slate, talc, limestone, stone powder, and powdered slag.

The quantity of asphaltic bitumen in the composition should be adjusted to the hollow space in the mineral aggregate, i.e. the quantity of asphaltic bitumen should be such that after the composition has been compacted in order to manufacture the molded article, a small void, for example approximately 2–4% by volume, still remains. If too much asphaltic bitumen is used the composition will be overfilled and the molded articles manufactured from the compositions will not retain their shape. If too little asphaltic bitumen is used the compositions are difficult or quite impossible to handle and any molded articles obtained are porous. The quantity of asphaltic bitumen required is generally in the range of from 4–10% by weight, preferably 5–8%, based on the total composition.

If the composition is prepared from a well-graded mineral aggregate and a quantity of asphaltic bitumen adjusted thereto, the composition will have maximum stiffness after being compressed, or in other words, the molded articles will have maximum non-deformability.

The hard-blown asphaltic bitumens having a softening point (ring and ball) of 120–175° C. described in the German patent specification No. 750,627 are not the correct ones, since the use of these asphaltic bitumens makes it necessary to prepare and handle the compositions at a temperature of 250–300° C. However, temperatures exceeding 250° C. are the very ones at which the phenomenon of so-called "combustion" (i.e. partial carbonization) of the asphaltic bitumen begins to occur. It is true that the use of asphaltic bitumens having a relatively low softening point permits a reduction in the temperature at which the compositions are prepared and handled, but this generally results in loss of non-deformability of the molded articles which are to be obtained. Now, it has been found that only very specific types of asphaltic bitumen are suitable, viz. those having a penetration index not exceeding +5, preferably not exceeding +4.5, and whose softening point (ring and ball) and penetration (100 grams, 5 secs., 25° C.) are such that they satisfy the formula $$V = 90 + 30 \log p \pm 15$$

wherein V is the softening point in ° C. and p the penetration. Preferred asphaltic bitumens satisfy the formula $$V = 90 + 30 \log p \pm 10$$

Asphalts meeting this formula preferably have ring and ball softening points between about 95 and 120° C. and penetrations at 25° C. between about 3 and 13.

Compositions comprising these asphaltic bitumens may be prepared and worked up at temperatures in the range of 200 and 250° C. into hollow molded articles having properties which are in every way satisfactory.

*Example*

40 parts by weight of stone, 40 parts by weight of sand and 20 parts by weight of quartz powder were mixed at a temperature of 240° C. with 7.2 parts by weight of asphaltic bitumen having a softening point (ring and ball) of 115° C., a penetration (100 grams, 5 sec., 25° C.) of 5, and a penetration index of +3.5. At the above temperature the resultant composition obtained was compacted into molds under pressure in order to manufacture pipes 1 meter long, having an inside diameter of 15 cm. and a wall thickness of 3 cm., having properties which were in every way satisfactory.

In addition to the manufacture of hollow molded articles, the compositions of the invention may be used for the manufacture of solid molded articles, such as bricks, sheets and sleepers.

We claim as our invention:

1. A moldable asphalt-aggregate composition consisting essentially of 4–10% by weight of an asphaltic bitumen having a penetration index less than +5 whose ring and ball softening point and penetration satisfy the formula $$V = 90 + 30 \log p \pm 15$$

wherein $V$ is the softening point in ° C. and $p$ is the penetration at 25° C., 100 grams load, 5 seconds time, said bitumen having a softening point of 95–120° C. and a penetration of 3–13; and 90–96% by weight of an aggregate, said aggregate comprising 30–60% by weight of stone, 25–50% by weight of sand and 5–25% by weight of inorganic filler passing a sieve having square mesh openings 0.075 mm. wide.

2. A molded asphalt-aggregate composition consisting essentially of 4–10% by weight of an asphaltic bitumen having a penetration index less than about +4.5, a softening point between about 95° C. and about 120° C. and a penetration at 25° C., 100 grams load, 5 seconds time between about 3 and about 13, the ring and ball softening point and penetration satisfying the formula $$V = 90 + 30 \log p \pm 15$$

and 90–96% by weight of an aggregate, said aggregate comprising 30–60% by weight of stone, 25–50% by weight of sand and 5–25% by weight of inorganic filler passing a sieve having square mesh openings, 0.075 mm., the molded composition containing 2–4% by volume void space.

References Cited in the file of this patent

UNITED STATES PATENTS

| | | |
|---|---|---|
| 1,559,731 | Muller | Nov. 3, 1925 |
| 2,080,690 | Bray | May 18, 1937 |
| 2,446,903 | Bright | Aug. 10, 1948 |
| 2,572,068 | Sommer | Oct. 23, 1951 |
| 2,767,102 | Edson | Oct. 16, 1956 |
| 2,909,440 | Cobb | Oct. 20, 1959 |

FOREIGN PATENTS

| | | |
|---|---|---|
| 750,627 | Germany | Nov. 8, 1951 |